United States Patent [19]
Chris et al.

[11] Patent Number: 5,980,599
[45] Date of Patent: Nov. 9, 1999

[54] IN-TANK PURIFIER WITH BYPASS FOR FILLING

[75] Inventors: Timothy Chris, Folsom; David A. Le Febre, Camino, both of Calif.

[73] Assignee: UOP LLC, Des Plaines, Ill.

[21] Appl. No.: 09/049,572

[22] Filed: Mar. 27, 1998

[51] Int. Cl.[6] .................................................. B01D 46/42
[52] U.S. Cl. ............................... 55/312; 55/313; 55/417; 55/418
[58] Field of Search .............................. 55/417, 418, 420, 55/312, 313, 314

[56] References Cited

U.S. PATENT DOCUMENTS

| | | | |
|---|---|---|---|
| 1,821,549 | 9/1931 | Hornor et al. | 35/417 |
| 2,468,340 | 4/1949 | Mirassou | 55/418 |
| 3,148,965 | 9/1964 | Summerfield | 55/313 |
| 4,032,311 | 6/1977 | Bohmrich et al. | 55/418 |
| 4,483,461 | 11/1984 | Igarashi | 55/417 |
| 5,409,526 | 4/1995 | Zheng | 96/132 |

*Primary Examiner*—Duane S. Smith
*Attorney, Agent, or Firm*—Thomas K. McBride; John G. Tolomei

[57] ABSTRACT

A displaceable purifier body improves the delivery of high purity gases from gas tanks or cylinders by providing a large flow area for filling the cylinder or tank with gas while preventing contamination of gases during the filling procedure and by automatically engaging the purifier for purification when withdrawing gas from the tank or cylinder. The purifier body or a separate seal body has an arrangement for reciprocal movement between a filling position wherein the gas entering the cylinder by-passes the purifier body and an engaged position wherein the purifier body moves towards the cylinder head assembly to prevent by-passing of exiting gases around the purifier. This arrangement offers little restriction to gas flow entering the cylinder and allows rapid filling of cylinders to make gas delivery more economical. The arrangement can also provide an indicator showing positive engagement of the purification system during gas withdrawal and a simple method for manually disengaging the purifier to allow exiting gas to bypass the purifier when desired.

25 Claims, 3 Drawing Sheets

IN-TANK PURIFIER WITH BYPASS FOR FILLING

FIELD OF THE INVENTION

This invention relates to a purifier for supplying high purity fluid from tanks or cylinders.

BACKGROUND OF THE INVENTION

Many commercial processes use high purity gas from the tanks or cylinders of compressed or liquefied gas. For example, the electronics industry requires high purity gases and gas mixtures which are substantially free from other compounds that serve as impurities and contaminate the gas for its intended use. High purity gases and gas mixtures containing less than a total of 50 parts per million (ppm) nitrogen, oxygen, carbon monoxide, carbon dioxide, hydrocarbons and water are routinely required. More demanding purity applications decrease contaminants to less than a few parts per million of a specific impurity, for example water. More recently, even more stringent specifications have been set down requiring impurity concentration of less than several parts per billion.

Ordinarily tanks or cylinders can not directly supply gas of sufficient purity for such processes. Even special preparation of the cylinders by polishing and baking the inner surfaces still fails to produce sufficient purity. Therefore, purifiers at the point of use are commonly employed to remove contaminants and raise the purity of the gas as it is delivered.

U.S. Pat. No. 1,821,549 establishes the long known use of in-tank purifiers to remove contaminants from compressed gases or liquefied gases delivered by high pressure cylinders. Economical cylinder design results in a single opening for filling and delivery of gases from the cylinder. Filling the gases and removing purified gases from the same opening has presented persistent problems. Filling the cylinder by passing gas through a purifier located therein loads the outlet region of the purifier with contaminants that can reenter the gas stream delivered by the cylinder. U.S. Pat. No. 5,409,526 discloses an apparatus arrangement for filling a cylinder with a gas through one port defined in a cylinder head and discharging gas through another port into which a purifier supplies exiting gas. While U.S. Pat. No. 5,409,526 solves problems related to the contaminating the purifier with incoming gas, the need to provide two separate ports through the limited cross section of the cylinder head impedes rapid filling of the cylinder with gas.

It is an object of this invention to provide an apparatus that facilitates filling of tanks or cylinders as well as purification of delivered gas as it exits a cylinder or tank.

It is an additional object of this invention to provide an apparatus that indicates the operating state of an in-tank purifier.

It is a further object of this invention to provide an arrangement that will simplify by-passing of a purifier to rapidly evacuate gases from a cylinder or tank.

SUMMARY OF THE INVENTION

The present invention provides an in-tank purifier arrangement wherein the purifier or related control element reciprocates between different positions for filling a vessel comprising a cylinder or a tank and for withdrawing purified gas from the vessel (hereinafter referred to as a "tank" without specific limitation thereto). The purifier or a related control element reciprocates between a disengaged position for filling the tank while by passing the purifier and an engaged position that seals the communication of exiting gas from the purifier to the tank outlet. Optional manual control of the purifier or control element position will permit rapid evacuation of the tank by bypassing the purifier. Gases entering and exiting the tank pass through the same port whether passing through the purifier or by-passing the purifier. The use of a single port through the tank inlet permits the port to have a large flow area through the narrow neck of the tank that facilitates filling of the tank with gases.

Any ordinary configuration of in-tank purifier can operate in conjunction with this invention. An important feature of this invention is the selective bypassing of the flow of gas through the purifier. The single port of the high pressure tank head contains a port body threaded into a relatively narrow inlet of the tank. The port body defines the single fluid port for fluid filing and withdrawal. Typically the tank head contains a gas control valve. Components in addition to the usual control valve provide the bypass operation. The bypass operation has a first function that provides a bypass so that at least a majority of the gas that enters the tank does not flow through the purifier. As a second function the bypass operation includes a one way seal that inhibits gas flow into the purifier at least until its initial engagement for purifying gas as it exits the tank. Suitable one way seals include burst discs that will prevent fluid flow until an initial start of fluid flow out of the tank through the purifier or one-way poppet valves that prevent fluid flow back through the purifier into the tank. The purifier may use a poppet valve in conjunction with a burst disc where the burst disc maintains the purifier in a pristine state until its first use. When used in conjunction with a poppet valve the burst disc preferably seals the inlet end of the purifier. Both functions of the by pass operation may be incorporated into the body of the purifier that contains the purification material. Alternately, separate components may provide either or both functions in an independent control element that cooperates with the purifier and has sealed communication therewith.

Accordingly, in one embodiment this invention is an apparatus for purification of fluids delivered from a tank opening. The apparatus comprises a port body adapted for sealing engagement with the tank opening having an inner end facing the inside of the tank and an outer end that faces the outside of the tank. A fluid port defined by the port body has an inner opening that communicates with the inner end and an outer opening that communicates with the outer end. A valve assembly controls fluid flow through the outer opening. A first seal surface surrounds the inner opening. A seal body having closed communication with the outlet of a purifier defines a second seal surface for sealing engagement with the first seal surface wherein the seal body is adapted for displacement away from the first seal surface to establish a fluid flow path from the fluid port into the tank that inhibits fluid flow through the purifier and for displacement toward the first seal surface to establish a fluid flow path from the tank to the fluid port that passes fluid through the purifier and that inhibits direct fluid flow from the tank into the fluid port.

In another embodiment this invention is a valve assembly for purifying gas delivered from a compressed gas cylinder. The valve assembly comprises a valve body adapted for insertion into the throat of the cylinder. A main bore extends axially through the valve body. The valve body defines a transverse bore that intersects the main bore. The valve body also retains a valve seat positioned to control fluid flow from the main bore through the transverse bore. A purifier having an outlet proximate the valve body is slidably fixed to the valve body for axial movement relative thereto. The valve body and the purifier contain cooperating sealing surfaces adapted for sealing engagement by movement of the purifier toward the valve body to establish a fluid seal between the main bore and the purifier outlet. Means are also provided for displacing the purifier away from the valve body when gas enters the cylinder and for urging the purifier toward the valve body when gas exits the cylinder.

In a more limited embodiment this invention is an assembly for purifying gas delivered from a tank in the from of a cylinder containing compressed gas. The valve assembly comprises a valve body having an inner end adapted for insertion into the throat of the cylinder. A main bore extends axially through the valve body. The valve body defines a transverse bore that intersects the main bore and a valve seat positioned to control fluid flow from the main bore to the transverse bore. An extended end of a piston extends from the inner end of the main bore. The extended end of the piston retains the outlet end of a purifier for axial movement relative to the valve body under control of the piston. Cooperating sealing surfaces on the valve body and the purifier provide sealing engagement when the piston urges the purifier toward the valve body to establish a fluid seal between the main bore and the purifier outlet. A burst disc located across the outlet of the purifier provides back pressure that displaces the purifier away from the valve body when gas enters the cylinder and blocks gas flow from entering the purifier until gas is withdrawn from the cylinder through the purifier.

In more limited apparatus embodiment this invention is a purifier for purifying gas delivered from tank to a gas port of a port body. The purifier includes a purifier body defining an outlet at one end of the body and an inlet. The purifier retains a purification medium. The purifier body defines a flow path for gases from the inlet through the outlet. Means for inhibiting gas flow are located in the purifier and inhibit the flow of gas from the outlet to the inlet of the purifier. The purifier body defines a sealing surface proximate the outlet for providing sealed communication of gas from the purifier into a gas port. A connection on the purifier can secure the purifier to the port body for slidable movement therewith.

The in-tank purifier of this invention reduces the expense and improves the convenience of delivering relatively contaminant free gases from refillable tanks and cylinders. Under usual conditions, in-tank purifiers of this invention can readily accommodate 20 more refill cycles before requiring replacement of the purification element. Therefore in many services tank usage can extend to 10 years or more without replacement of the purifier or cleansing of the tank.

Additional objects, embodiments, advantages, and details of the invention are described in the following detailed description of the preferred embodiments.

DETAILED DESCRIPTION OF THE INVENTION

Figure 1:
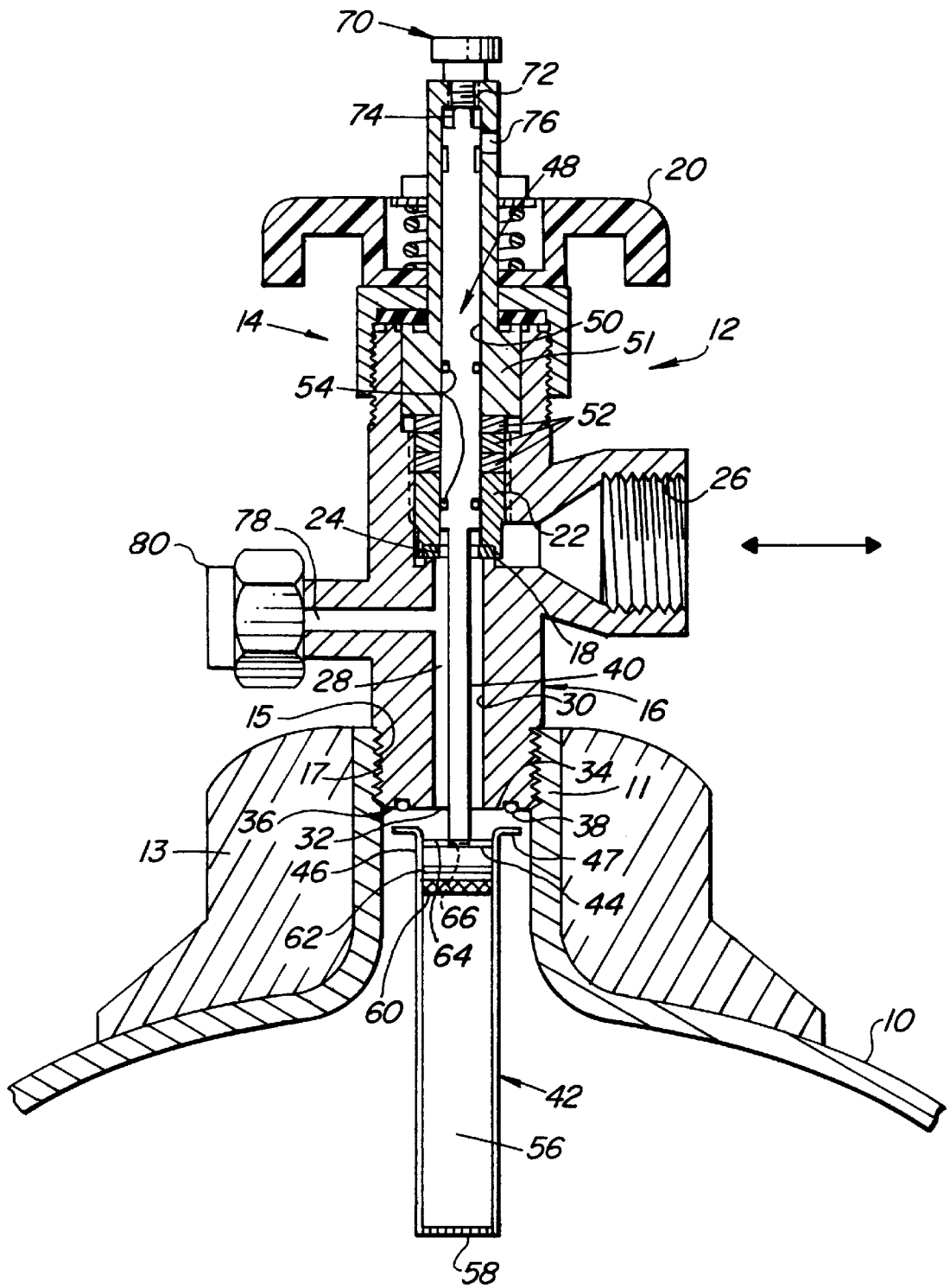
FIG. 1 is a cross-sectional view of a cylinder head valve assembly incorporating the purifier arrangement of this invention.

Looking then at FIG. 1, a compressed gas tank in the form of a cylinder 10 retains a cylinder head assembly 12 that has a valve assembly 14 located in an upper portion and a port body 16 located in a lower portion. A valve handle 20 regulates the position of a valve cylinder 22 to control gas flow across a valve seat 18 by positioning sealing element 24. Valve seat 18 and sealing element 24 control gas flow between an inlet-exhaust port 26 and a fluid port 28. A main bore 30 extending, preferably through the center of a port body 16 that defines fluid port 28. The inlet exhaust port ordinarily extends transversely through the valve body to intersect fluid port 28. It is not essential to this invention that the valve assembly be incorporated directly on to port body 16 and the valve body may be provided by a separate assembly that communicates with the fluid port 28.

Gas cylinder 10 ordinarily has the familiar arrangement of an upper outlet nozzle 11 integrally formed therein with optional nozzle reinforcement 13 attached to the cylinder and surrounding the thin wall of nozzle 11. Typically, in such arrangements port body 16 has an outer threaded portion 15 that engages an internally threaded portion 17 of nozzle 11 for engagement of the cylinder head assembly therein.

To the inside of port body 16, fluid port 28 defines an inner opening 32 about its inner end 34. Inner end 34 defines a first sealing surface 36 that retains an O-ring 38 to provide a seal for gas delivered from the a purifier body 42. In one form purifier body 42 has an inner volume 56 that retains a purification material usually in the form of a sorbent material (not shown) for sorbing contaminants from gas that enters through a filter element 58 provided by a screen across the open bottom of the purifier body. Filter element 58 retains the sorbent in volume 56. A porous frit 60 prevents gas lift through purifier body 42 from entraining purifying medium and carrying it out of purifier body 42.

A control rod 40 extending through main bore 30 retains a seal body 46. Seal body 46 is located about outlet end 44 of purifier body 42. Seal body 46 may defines the outlet end 44 of purifier body 42. Seal body 46 may be integral with the purifier body as shown in FIG. 1 or a separate element in sealed communication with the purifier body as previously mentioned. Seal body 46 defines a second sealing surface 47 for cooperation with the first sealing surface 36 to close outlet end 44 into sealed communication with fluid port 28. The second sealing surface 47 appears as an outwardly flared portion of sealed body 46.

The seal body reciprocates toward and away from the port body 16 and, in particular, first sealing surface 36 by movement on control rod 40. When control rod 40 urges purifier body 42 towards port body 16, sealing surfaces 36 and 47 prevents gas flow exiting the tank from by passing the purifier 42.

A piston 48 fixed to the end of control rod 40 provides one means for regulating movement of seal body 46 toward or away from port body 16. A cylindrical bore 50 that extends co-axially with main bore 30 through valve assembly components 52 and valve plunger 51 retains piston 48 for reciprocating movement therein. O-rings and retaining grooves 54 seal pressurized gas from flowing around piston 48 and out of the end of valve plunger 51.

FIG. 1 shows control rod 40 extended from piston 48 into cylinder 10. An open and rigid web 64 secures control rod 40 to the seal body 46. Preferably, web 64 provides a detachable connection 66 to permits easy removal of the purifier body from control rod 40 for replacement of the purifier body after use or after exhaustion of the purifying capacity of the purifying material. More preferably connection 66 comprises a threaded connection.

During a normal filling operation, gas flows in through inlet-exhaust port 26, across valve seat 18, through fluid port 28 and into gas cylinder 10. Purifier body 42 remains in the position shown in FIG. 1 providing an unobstructed gas flow between sealing surfaces 36 and 47. By this arrangement, the flow area available for the filling of cylinder 10 receives virtually no flow restriction from the presence of the purifier. For rapid filling, fluid port 28 will ordinarily have a open flow area equal to at least 5% of the open flow area across nozzle 11. This large, open area permits rapid filling of the tank without restriction and increases the economics of gas delivery.

The large open flow area for by passing inhibits fluid flow through the purifier while filling cylinder 10 with gas. For some purification materials the pressure drop alone through the purifier may sufficiently inhibit gas flow to adequately eliminate purifier contamination during filling of the cylinder. Preferably the seal body 46 or the purifier body 42 provides a direct means of blocking gas flow through the purifier. FIG. 1 shows a burst disc 62 for preventing gas flow into the purifier across the outlet provided by web 64 until the purifier is sealed with the port body for removal of gas from the cylinder.

Until gas delivery from the gas cylinder is desired, purifier body 42 remains offset from port body 16 to bypass entering gas. To this end, an optional vent plug 70 may maintain rod 40 displaced downwardly away from sealing engagement with port body 16 by contact with an outer end 74 of piston 48. Engagement of threads on plug 70 with an upper threaded portion 72 of valve plunger 51 maintains downward pressure on piston 48.

Delivery of purified gas through inlet-exhaust port 26 begins with removal of plug 70. After removing vent plug 70 internal pressure from the cylinder raises piston 48. Pressure urges piston 48 outwardly in cylindrical bore 50 such that the flared ends of secondary sealing surface 47 contact O-ring 38 to establish a purifier seal that restrict gas leaving cylinder 10 to flow through purifier 42 before exiting from fluid port 28. Notice that purifier 42 may be brought into engagement before delivering gas from port 26. Upward displacement of piston 48 through bore 50 may also indicated sealing engagement of the purifier. For this purpose, an indicator hole 76 may visually indicate when purifier body 42 has risen into sealing engagement for delivery of purified gases.

Burst disc 62 remains intact until such time as gas is withdrawn from inlet exhaust port 26. Thus, burst disc 62 prevented in-flowing gas from passing through purifier body 42 and maintain the purification material in pristine condition until use. Opening of valve assembly 14 creates sufficient pressure drop to break burst disc 62 and permit gas flow through purifier body 42 across the outlet provided by web 64 for delivery from fluid port 28 through inlet-exhaust port 26.

In the event that the purification material in purifier 42, frit 60, or filter element 58 become clogged thereby retaining gas within gas cylinder 10, gas may be by-passed around the purifier by manually disengaging the sealing surfaces of the purifier body and the port body. Downward pressure on piston end 74, preferably by screwing plug 70 back in place, will displace the purifier body from the sealing surfaces 36 and 47 thereby permitting gas to by pass the purifier and flow out from fluid port 28. Gas may exit from fluid port 28 via inlet exhaust port 26 or a blow port 78 that ordinarily remains sealed via a blow plug 80.

As can be readily appreciated by those skilled in the art, a variety of methods may be used to control the displacement of the sealed body relative to port body 16 and to obtain the selective engagement of the purifier when withdrawing gas from the cylinder. Optionally, the burst disc arrangement may be replaced with a simple poppet valve arranged to block fluid flow into the purifier body and to permit fluid flow from the outside of the purifier body through its outlet end. Such a poppet valve may be located at the outlet end or the inlet end of the purifier body. Either location will inhibit gas flow through the normally impermeable walls of the purifier body. As mentioned previously, in cases where there is a sufficiently high pressure drop through the purification medium in the purifier body, the purifier body itself may provide sufficient flow inhibition for fluid entering the cylinder to eliminate the need for a separate flow control device such as the poppet valve or burst disc. However, the purifier is ordinarily designed to have minimal pressure drops such that the purifier body or seal body will ordinarily include means for inhibiting entering gas from flowing therethrough.

In simplified arrangements of this invention, it is also not necessary to provide a control piston for movement of the purifier body toward or away from the port body 16. Fluid flow around the end of the purifier body may be sufficient to create sealing engagement of the purifier body with the port body thereby directing all further gas flow through the purifier. Alternately a the purifier may be resiliently biased into sealing engagement with the sealing surfaces such that filling pressure will displace the purifier for bypassing of incoming gases.

Figure 2:
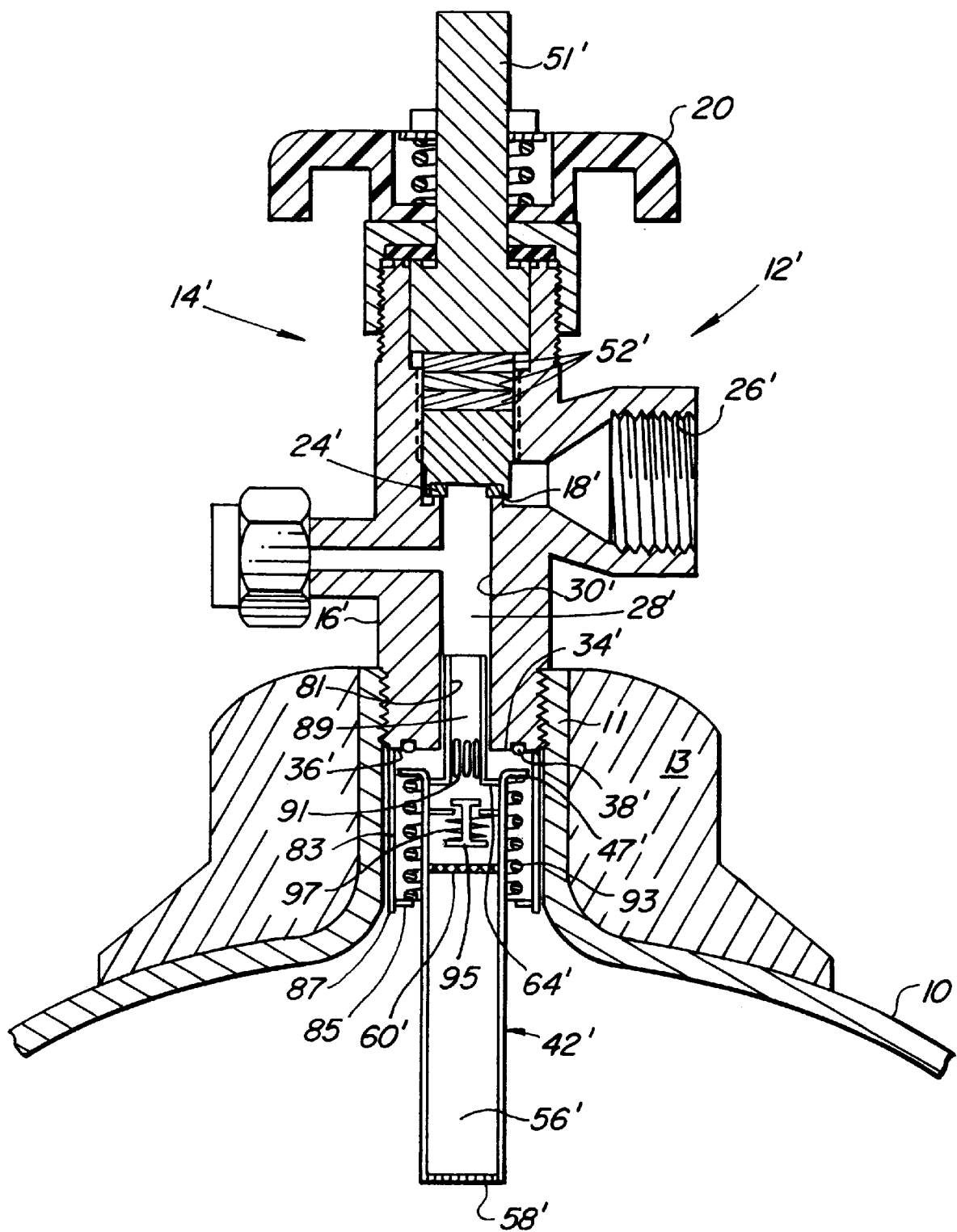
FIG. 2 is a modification of the purifier assembly shown in FIG. 1.

FIG. 2 shows an alternate purifier arrangement that removes the vent plug and piston. Looking then at FIG. 2, a gas cylinder 10 again defines a nozzle 11 that retains a cylinder head 12'. Cylinder head 12' has a valve assembly 14' with a valve handle 20 that regulates the position of a solid valve plunger 51'. Valve plunger 51' which acts upon seal components 52' to control the gas flow across a valve seat 18' by applying pressure to a sealing element 24'. A port body 16' defines main bore 30'. The valve assembly 14' controls flow between a fluid port 28' defined by main bore 30' which communicates with an inlet exhaust port 26' across the valve seat 18'.

Main bore 30' retains a guide sleeve 81 of a purifier body 42'. Guide sleeve 81 maintains purifier body 42' aligned with port body 16' and a first sealing surface 36' that retains an O-ring 38' for providing a purifier seal by contact with a flared sealing surface 47' at the outlet end of purifier body 42'. A retainer housing 83 holds purifier body 42' at the inner end 34' of port body 16'. Retainer housing 83 may be slotted to provide additional flow area for by-passing the purifier when loading cylinder 10 with gas. Preferably, retaining housing 83 has a lower clip arrangement 87 for releasably securing a retaining plate 85. A spring 93 positioned between the outside of flared sealing surface 47' and the inside of retaining plate 85 biases sealing surface 47' toward sealing surface 36' and into contact with O-ring 38'.

The purifier provides a gas flow passage into cylinder 10 via inlet exhaust port 26' through fluid port 28' and a central port 89 defined the hollow interior of guide sleeve 81. Slots 91 in guide sleeve 81 and openings in rigid web 64' provide a large flow area for gas that by-passes purifier 42'. When gas flows into cylinder 10 from fluid port 28', poppet valve 95 obstructs gas flow into purifier 42' and gas pressure downwardly displaces the purifier causing all gas entering cylinder 10 to by-pass the purifier.

Once gas flow stops, spring 93 pushes the flange of sealing surface 47' against O-ring 38' to engage purifier 42' in a position for purifying any gas that exits cylinder 10. As gas flow out of cylinder 10 begins, gas pressure opens poppet 95 and gas flows across filter element 58' through a purification medium 56' that is again held in place by a frit 60'. In this way, gas entering or exiting the cylinder flows through the same fluid port 28' defined by port body 16'.

Preferably the force of poppet spring 97 biases poppet valve 95 into a closed position when the tank pressure drops below a minimum desired pressure. In this manner spring 97 traps sufficient residual gas to maintain a positive gas pressure in the tank. A positive gas pressure in the tank prevents back flow of contaminated gases into the tank. In most cases setting the poppet valve to close at a tank pressure of 250 psi or less will protect the tank against backflow and accidental contamination.

Retaining plate 85 permits simple replacement of the purifier body 42' when the purification material therein is spent and can not provide continued purification. Retaining plate 85 has a well known design such that upward displacement and rotation will align it with slots for its removal and the subsequent removal of the entire purification body 42'. A new purifier body 42' containing fresh purification material is again easily installed by inserting guide sleeve 81 into main bore 30 and positioning retaining plate 85 into a locked position with clip arrangement 87.

This invention can use most arrangements of the purification medium in the purifier. Preferably Filter element 58 and frit 60 can provide two stages of particle filtration for gases entering and exiting the cylinder 10. Filter element 58 may remove particles having diameters greater than about 5 microns and frit 60 may be selected to remove finer particles that may pass through the purification material. Suitable purification materials can be any material that will remove the desired contaminants down to suitable purity levels. Chemisorbent materials that provide impurity removal by reacting out or adsorbing contaminant substances are suitable as well as physical adsorbents such as zeolites that have a suitable pore structure affinity for removing contaminant molecules are particularly preferred. Sorbents and filter mediums that are suitable for incorporation into the purifier body are well known by those skilled in the art.

Figure 3:
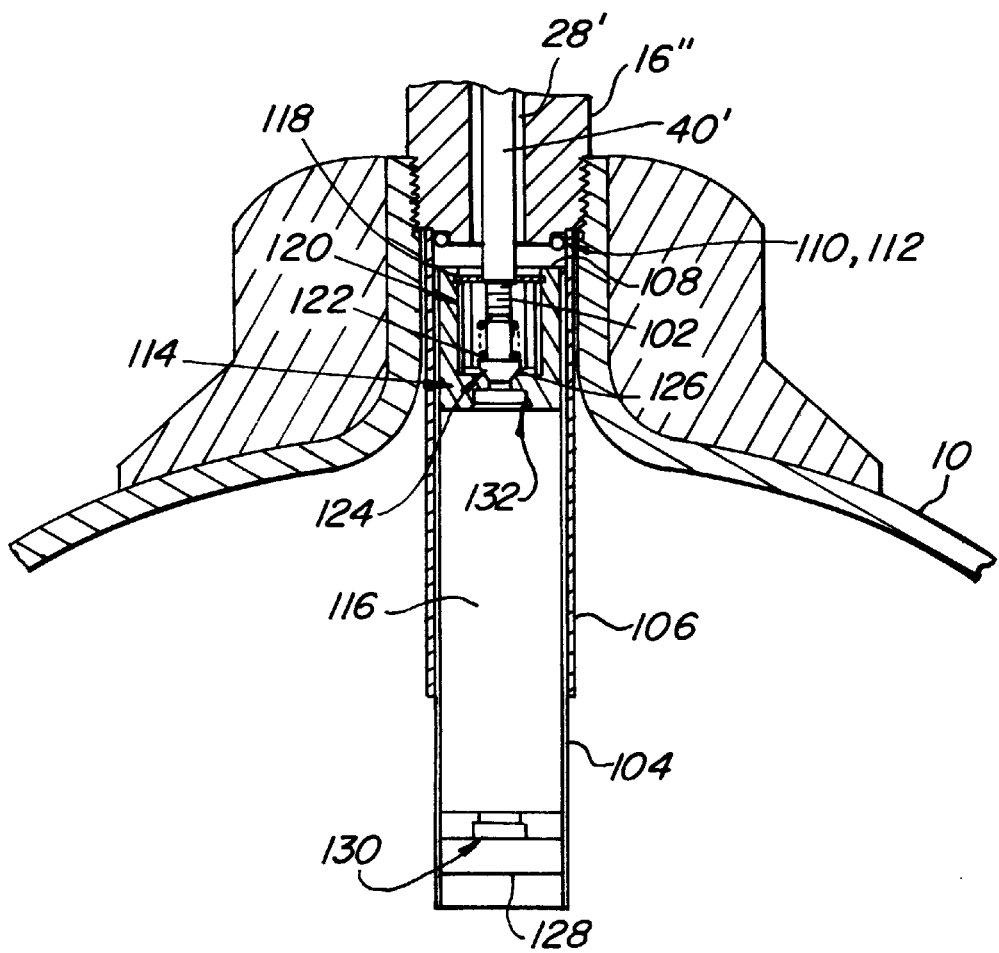
FIG. 3 is an alternate modification of the purifier assembly of FIG. 1.

FIG. 3 shows yet another arrangement for the purifier at the bottom of a port body 16". The upper omitted portion of port body 16" ordinarily contains a cylinder head assembly substantially the same as that indicated by reference number 12 in FIG. 1. A control rod 40' extends a lower threaded end 102 downward from the cylinder head assembly (not shown) into tank 10 to secure control rod 40' to a purifier body 104. The purifier body 104 can slide freely within a slotted guide tube 106. The slots (not shown) in guide tube 106 allow the free communication of entering gas from fluid port 28' into the interior of tank 10 during a filling cycle. Throughout the filling cycle purifier body 104 remains in a lower position so that entering gas flows between a sealing surface 108 at the top of the purifier body and a sealing an O-ring in sealing surface 110 at the bottom of port body 16".

During the filling stage a poppet body 114 prevents any flow of entering gas through the purification material 116 retained in purifier body 104. A retaining ring 118 holds a poppet insert 120 in place at the inlet end of the poppet body 114. Poppet insert 120 positions a poppet spring 122 in a biasing relationship against a poppet plunger 124 that acts against a valve seat 126 to prevent inflow of fluid from fluid port 28' through the purifying material 116 during the filling of tank 10.

As previously explained in conjunction with FIG. 1 when tank 10 begins supplying gas, control rod 40' urges purifier body 104 upwardly creating sealing contact between sealing surfaces 108 and 110 through O-ring 112. Outflow of gas from the tank breaks an optional bursts disk 128 thereby opening the purifier body 104 for gas flow through a frit 130, purification material 116, and a frit 132 before displacing poppet plunger 124 upwardly to permit gas flow around valve seat 126 and out of the port body 16" through fluid port 28'. Again, poppet spring 122 preferably has sufficient sealing pressure to maintain a positive pressure in the tank that will prevent back flow of gas when the tank pressure drops below a desired value.

We claim:

1. An apparatus for purification of fluids delivered from a tank opening, said apparatus comprising:

a port body adapted for sealing engagement with said tank opening having an inner end facing the inside of the tank and an outer end that facing the outside of said tank;

a fluid port defined by said port body having an inner opening that communicates with the inner end of the port body and having an outer opening that communicates with the outer end of the port body;

a first seal surface located about the inner opening; and, a seal body having closed communication with the outlet of a purifier and defining a second seal surface for sealing engagement with said first seal surface wherein the seal body is adapted for displacement away from the first seal surface to establish a fluid flow path from the fluid port into the tank that inhibits fluid flow through the purifier and for displacement toward the first seal surface to establish a fluid flow path from the tank to the fluid port that passes fluid through the purifier and that inhibits direct fluid flow from the tank into the fluid port.

2. The apparatus of claim 1 wherein the tank comprises a cylinder for holding high pressure gases, wherein the cylinder has a single tank opening and wherein a valve assembly controls fluid flow through the outer opening.

3. The apparatus of claim 1 wherein the fluid port has flow area equal to at least 5% of the flow area of said tank opening.

4. The apparatus of claim 1 wherein said port body retains a valve assembly.

5. The apparatus of claim 1 wherein the first seal surface comprises an O-ring and O-ring groove that surround the inner opening.

6. The apparatus of claim 1 wherein a purifier integrally defines the seal body about the outlet of the purifier and the purifier reciprocates axially with respect to the port body to cause the displacement of the second seal surface.

7. The apparatus of claim 1 wherein a poppet valve located in the purifier body blocks fluid flow from the fluid port into the purifier.

8. The apparatus of claim 1 wherein a poppet valve is located at the outlet end of the purifier and retains a positive pressure in the tank.

9. The apparatus of claim 1 wherein a burst disc blocks fluid flow from the fluid port into the purifier until fluid is withdrawn from the tank through the purifier.

10. The apparatus of claim 1 wherein displacement of the seal body toward the first seal surface moves an indicator member to a position that indicates that the purifier is functioning.

11. The apparatus of claim 6 wherein a displacement rod extends through said fluid port and slidably retains the purifier and the displacement rod is adapted to displace the second seal from the first seal to permit bypassing of the purifier for emptying of the tank through the fluid port.

12. The apparatus of claim 1 wherein a spring urges the second seal surface into contact with the first seal surface.

13. The apparatus of claim 1 wherein the purifier provides sufficient pressure drop to inhibit fluid flow from the fluid port through the purifier.

14. A valve assembly for purifying gas delivered from a compressed gas cylinder, said valve assembly comprising
- a valve body adapted for insertion into the throat of the cylinder;
- a main bore extending axially through the valve body;
- a transverse bore defined by the valve body and intersecting the main bore;
- a valve seat positioned to regulate fluid flow through said transverse bore;
- a purifier slidably fixed to the valve body for axial movement relative thereto having an outlet proximate the valve body;
- cooperating sealing surfaces on the valve body and the purifier adapted for sealing engagement by movement of the purifier toward the valve body to establish a seal between the main bore and the purifier outlet; and
- means for displacing the purifier away from the valve body when gas enters the cylinder and for urging the purifier toward the valve body when gas exits the cylinder.

15. The apparatus of claim 14 wherein the main bore has flow area equal to at least 5% of the cross section of the throat.

16. The apparatus of claim 14 wherein the cooperating sealing surfaces comprise an O-ring and O-ring groove that surround the main bore.

17. The apparatus of claim 14 wherein a poppet valve located in the purifier retains fluid pressure for urging the purifier away from the valve body and inhibits gas flowing into the tank from passing through the purifier.

18. The apparatus of claim 17 wherein the poppet valve is located at the outlet end of the purifier.

19. The apparatus of claim 14 wherein a burst disc positioned across the outlet end of the purifier blocks gas flow into the cylinder from entering the purifier until fluid is withdrawn from the cylinder through the purifier.

20. The apparatus of claim 14 wherein the main bore passes through the center of the a valve body and a piston slidably retains the valve body in the main bore wherein displacement of the piston away from the cylinder moves the purifier toward the valve body and moves an indicator to a position that indicates that the purifier is functioning.

21. The apparatus of claim 20 wherein displacement of the piston toward the cylinder breaks any sealing engagement of the cooperating surfaces to permit bypassing of the purifier for emptying of the cylinder through the main bore.

22. The apparatus of claim 14 wherein a spring urges the purifier toward the valve body and supplies force for sealing engagement of the cooperating sealing surfaces.

23. A valve assembly for purifying gas delivered from an opening of a tank containing compressed gas, said valve assembly comprising:
- a valve body having an inner end adapted for insertion into the opening;
- a main bore extending axially through the valve body;
- a transverse bore defined by the valve body and intersecting the main bore;
- a valve seat positioned to regulate fluid flow through said transverse bore;
- a piston having a control rod extending toward said inner end through said main bore;
- a purifier having an outlet end fixed to the end of a the control rod for axial movement relative to the valve body under the control of the piston;
- cooperating sealing surfaces on the valve body and the purifier adapted for sealing engagement when the piston urges the purifier toward the valve body to establish a fluid seal between the main bore and the purifier outlet; and
- a poppet valve located at the outlet of the purifier to block gas flow entering the tank from entering the purifier until fluid is withdrawn from the tank through the purifier.

24. A purifier for purifying gas delivered from a tank to gas port said purifier comprising:
- a purifier body defining an outlet at one end of the body and an inlet;
- a purifying medium retained by the purifier;
- a flow path through the purifier for gas to flow from the inlet to the outlet;
- means for inhibiting gas flow from the outlet to the inlet through the purifier;
- a sealing surface defined by the purifier body proximate the outlet for providing sealed communication of gas from the purifier into the gas port; and,
- a connection for securing the purifier relative to the gas port.

25. The apparatus of claim 24 wherein the mean for inhibiting gas flow comprises a burst disc or a poppet valve.

* * * * *

UNITED STATES PATENT AND TRADEMARK OFFICE
CERTIFICATE OF CORRECTION

PATENT NO: 5,980,599
DATED: November 9, 1999
INVENTOR(S): Timothy Chris et al.

It is certified that an error appears in the above-identified patent and that said Letters Patent is hereby corrected as shown below:

At column 8, line 16, delete "that".

Signed and Sealed this

Eleventh Day of July, 2000

*Attest:*

Q. TODD DICKINSON

*Attesting Officer*      *Director of Patents and Trademarks*